(12) United States Patent
Costo

(10) Patent No.: US 7,720,075 B2
(45) Date of Patent: May 18, 2010

(54) NETWORK IDLE PROTOCOL WITH REDUCED CHANNELS

(75) Inventor: Avi Costo, Haifa (IL)

(73) Assignee: Intel Corporation, Santa Clara, CA (US)

(*) Notice: Subject to any disclaimer, the term of this patent is extended or adjusted under 35 U.S.C. 154(b) by 1988 days.

(21) Appl. No.: 10/465,132

(22) Filed: Jun. 19, 2003

(65) Prior Publication Data

US 2004/0258085 A1 Dec. 23, 2004

(51) Int. Cl.
*H04L 12/56* (2006.01)
(52) U.S. Cl. .................................. 370/395.53; 370/468
(58) Field of Classification Search ................. 370/445; 463/42
See application file for complete search history.

(56) References Cited

U.S. PATENT DOCUMENTS

2003/0016628 A1* 1/2003 Kadambi et al. ............ 370/235
2003/0206564 A1* 11/2003 Mills et al. .................. 370/528
2004/0147326 A1* 7/2004 Stiles .......................... 463/42
2006/0251082 A1* 11/2006 Grossman et al. ........... 370/394

OTHER PUBLICATIONS

Institute of Electrical and Electronics Engineers Standard 802.3, Clause 40; © 2000 IEEE; pp. 1078-1125.

* cited by examiner

*Primary Examiner*—Seema S Rao
*Assistant Examiner*—Wanda Z Russell
(74) *Attorney, Agent, or Firm*—Buckley, Maschoff & Talwalkar LLC

(57) ABSTRACT

According to some embodiments, a Gigabit Ethernet link is maintained with a link partner using less than four channels. Embodiments may also establish the Gigabit Ethernet link using four channels, determine that the link is idle, and terminate communication with the link partner over at least one of the four channels.

21 Claims, 5 Drawing Sheets

NETWORK IDLE PROTOCOL WITH REDUCED CHANNELS

BACKGROUND

Power consumption is a substantial factor in the design of computing devices. Reducing power consumption of a computing device may reduce the cost of heat dissipation systems within the device and may also reduce the cost of energy needed to operate the device. The usefulness of locally-powered devices often relates to their ability to function for extended periods using a single mobile power source. Consequently, a decrease in the power consumption of these devices may lead to a direct increase in their functionality.

DETAILED DESCRIPTION

Figure 1:
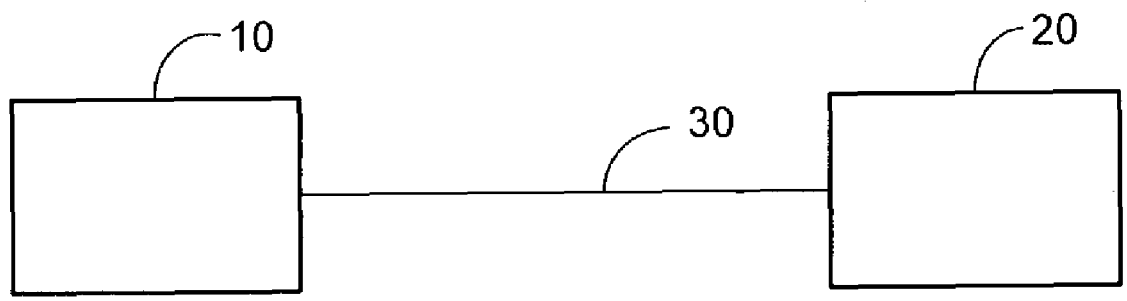
FIG. 1 is a diagram of a system according to some embodiments.

FIG. 1 is a diagram illustrating two devices in communication with one another according to some embodiments. Device 10 and device 20 may each comprise any device or devices capable of communicating via an Ethernet protocol over physical media 30. Such devices include but are not limited to Ethernet controllers, motherboards, expansion cards, line cards, personal computers, personal digital assistants, cellular telephones, kiosks, hubs and switches.

Device 10 and device 20 may comprise link partners that establish and maintain a Gigabit Ethernet link therebetween. A Gigabit Ethernet link may be governed by a protocol defined in the Institute of Electrical and Electronics Engineers 802.3, Clause 40 standard. As will be described in detail below, the defined protocol describes a system to maintain a link and to communicate over the link using four channels. In some embodiments, and contrary to conventional Ethernet protocols, device 10 and device 20 maintain a Gigabit Ethernet link therebetween using less than four channels.

Although physical media 30 is illustrated as a direct connection, any number of physical elements may reside between device 10 and device 20. More specifically, media 30 may comprise one or more of any number of different systems for transferring data via an Ethernet protocol, including a Local Area Network (LAN) and a Metropolitan Area Network (MAN). Moreover, physical media 30 may comprise one or more of any readable medium for transferring data, including coaxial cable, twisted-pair wires, fiber-optics, RF, infrared and the like. In some embodiments, a termination of physical media 30 at device 10 and device 20 includes four twisted-pair wires, with each twisted pair to carry signals for one of the four Gigabit Ethernet channels.

Figure 2:
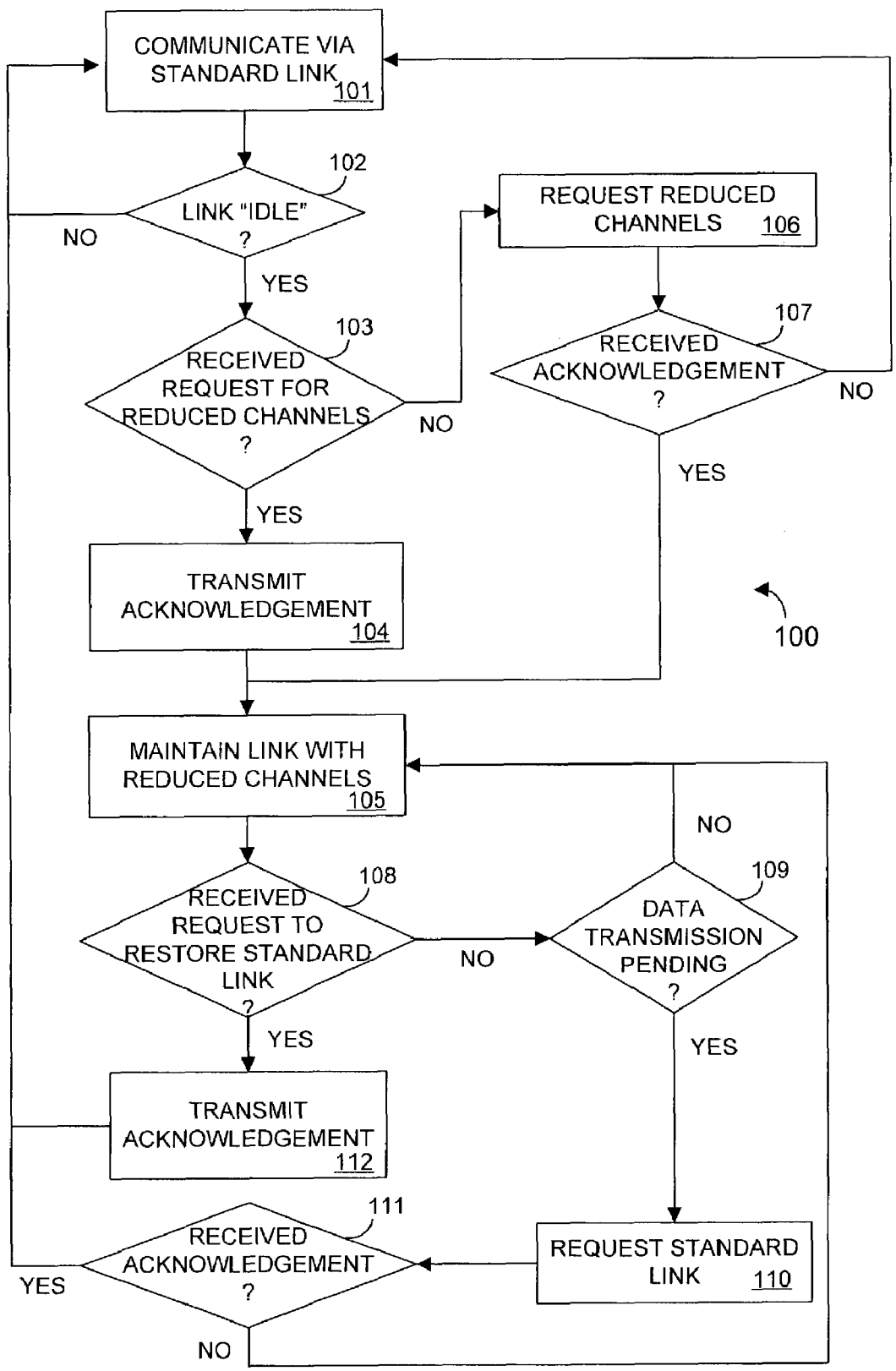
FIG. 2 is a flow diagram of process steps according to some embodiments.

FIG. 2 is a flow diagram of process 100 according to some embodiments. Process 100 may be performed by either or both of device 10 and device 20. Process 100 may be implemented by any combination of hardware, software or firmware. In some embodiments, process 100 is implemented by hardware of an Ethernet controller, while process 100 is implemented in other embodiments by any microcontroller executing locally- or remotely-stored microcontroller program code. The program code may be received from any medium, such as a hard disk, an IC-based memory, a signal, a network connection, or the like. In this regard, the program code may be "burned" into a programmable memory during production of the microcontroller.

Prior to process 100, a Gigabit Ethernet link is established between device 10 and device 20. The link may be established in response to the detection of energy pulses sent by device 20 and device 10 over physical media 30. As defined by the Ethernet specification, these pulses indicate that a link partner is available to establish an Ethernet communication link. Next, device 10 and device 20 may perform auto-negotiation to establish a Gigabit Ethernet link therebetween. A device uses auto-negotiation to detect the various modes that exist in a link partner, and to advertise it own abilities so as to automatically configure the highest performance mode of interoperation. Auto-negotiation at Gigabit speeds is defined at Clause 40.5 of the IEEE 802.3 standard.

Figure 3:
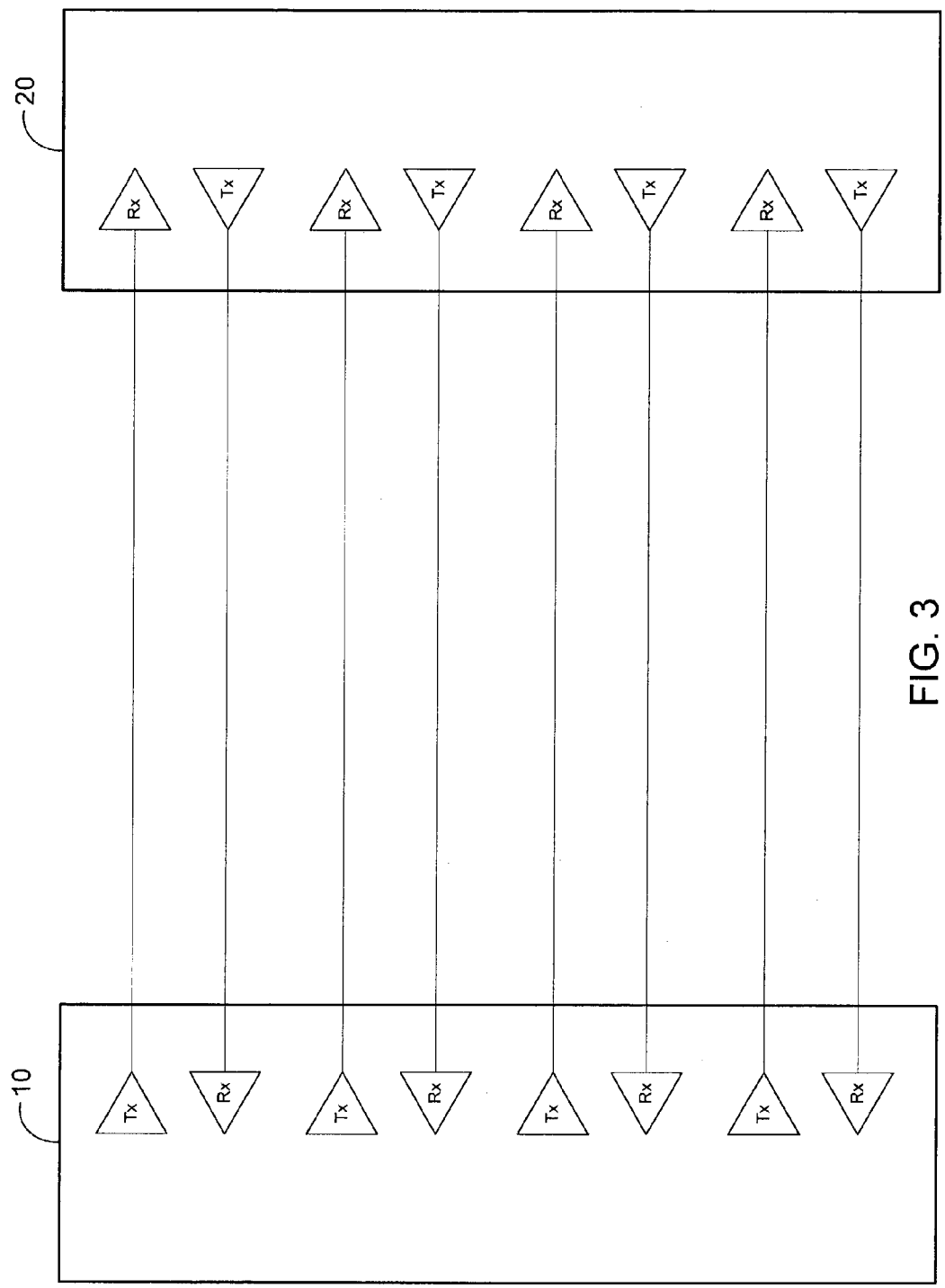
FIG. 3 is a representation of link channels according to some embodiments.

Device 10 may communicate with device 20 over the established Gigabit Ethernet link at 101. FIG. 3 illustrates link channels used by device 10 at 101 to communicate with device 20. The link comprises Channel A, Channel B, Channel C and Channel D. Each channel may comprise a wire to transmit data from device 10 to device 20 and a wire to receive data at device 10 from device 20. Channel A of device 10 need not correspond to Channel A of device 20. For example, data transmitted by device 10 over channel A may be received by device 20 over Channel B.

During communication, device 10 may be instructed to transmit a set of symbols to device 20 using the established link. According to conventional Gigabit Ethernet protocols, the entire set of symbols may be transmitted over each channel. Encoding applied to the symbols may, however, differ among the channels. The encoding for each channel may be based on a scrambler sequence maintained by device 10. Details of the scrambler, the encoding and communication using four channels are provided by the above-mentioned standard.

Symbols are periodically sent over each channel even if no actual data is to be transmitted between device 10 and device 20. These "idle" symbols indicate a state of the scrambler of the transmitting device, and the clock of the transmitting device is embedded in the signals that transmit these symbols. Accordingly, a receiving device may use the transmitted "idle" symbols to synchronize its decoding elements with the scrambler and the clock of the transmitting device. The synchronization allows the receiving device to properly decode any data received from device 10. Conventionally, the synchronization proceeds with respect to each of the four channels of the Gigabit link.

Returning to process 100, device 10 may determine whether the link is idle at 102. This determination may be based on a period of time since a last data transmission over the link or on any other measure. Operating system software of device 10 may monitor media 30 to determine whether the link is idle and may issue an indication if the determination is positive. If it is determined that the link is not idle, flow returns to 101 and continues to 102 for another determination of whether the link is idle.

If it is determined that the link is idle, it is determined whether a request for reduced channels has been received from device 20 at 103. The request may comprise one or more special symbols and/or packets which device 10 may recognize as a request to maintain the link using less than four channels. The request may be received before or after 102. An acknowledgement is transmitted to device 20 at 104 if such a request has been received. Next, device 10 maintains a link with device 20 at 105 using a reduced number of channels.

Flow proceeds from 103 to 106 in a case that no request is detected at 103. Device 10 may transmit a request for communication over reduced channels to device 20 at 1063. Device 10 waits for an acknowledgement of the request at 107. If an acknowledgement is not received within a specified time, or if a denial of the request is received, flow returns to 101. Flow continues to 105 if an acknowledgement is received at 107. In some embodiments, "handshaking" between link partners prior to entering a reduced channel mode differs from that described with respect to 103, 104, 106 and 107.

At 105, device 10 terminates communication with device 20 over at least one of the four channels and maintains a link with device 20 using the remaining less than four channels. Communication may be terminated over one or more channels, but communication is maintained over at least one channel in order to maintain the Gigabit Ethernet link established between device 10 and device 20. Maintaining the link using less than four channels may consume less power than maintaining the link using all four channels.

The channel(s) over which communication is maintained may be hard-wired or hard-coded into the system executing process 100. In some embodiments, each link partner is pre-programmed to maintain communication over channel A and to terminate communication over the other channels at 105. Since Channel A of device 10 may correspond to Channel B of device 20, the link partners may be pre-programmed to maintain communication over Channel A of the Master link partner. In this regard, auto-negotiation of the link prior to process 100 may result in one link partner being designated a Master link partner and the other link partner being designated a Slave link partner. The link partners may also or alternatively determine the particular channels over which communication is to be terminated at 105 during auto-negotiation.

As described above, the Gigabit Ethernet link is maintained at 105 using less than four channels. In order to maintain the link, the link partners may transmit information for synchronizing their scramblers and clocks over the less than four channels. The transmitted information may be similar to the information transmitted during idle periods as described above and by the above-mentioned standard.

At 108, device 10 determines if a request to restore a standard four-channel link has been received. Such a request may be received from device 20 in a case that device 20 wishes to transmit data to device 10. If a request is not received at 108, device 10 then determines at 109 whether a data transmission to device 20 is pending. Flow returns to 105 if no data transmission is pending.

The system of device 10 that implements process 100 may receive an instruction at 109 from an operating system of device 10. The instruction may instruct the system to transmit particular data to device 20. Flow proceeds from 109 to 110 since the instruction indicates that a data transmission is pending.

Device 10 transmits a request to resume communication over the four channels at 110. The request may be different from the request that may be received at 103 or transmitted at 106. In some embodiments, the request is identical to the request received at 103 or transmitted at 106, and comprises a "change mode" request. Device 10 waits for an acknowledgement of the request at 111 and returns to maintain the reduced-channel link at 105 if an acknowledgement is not received, or a refusal of the request is received, within a predetermined time. Device 10 resumes communication over the four channels at 101 if an acknowledgement is received at 111.

Returning to 107, an acknowledgement is transmitted at 112 if it is determined at 108 that a request to restore a standard four-channel link has been received. The request may, as mentioned above, be different from or identical to the request received at 103 or transmitted at 106. Flow then continues from 112 to 101 to resume communication with device 20 over the four channels.

Figure 4:
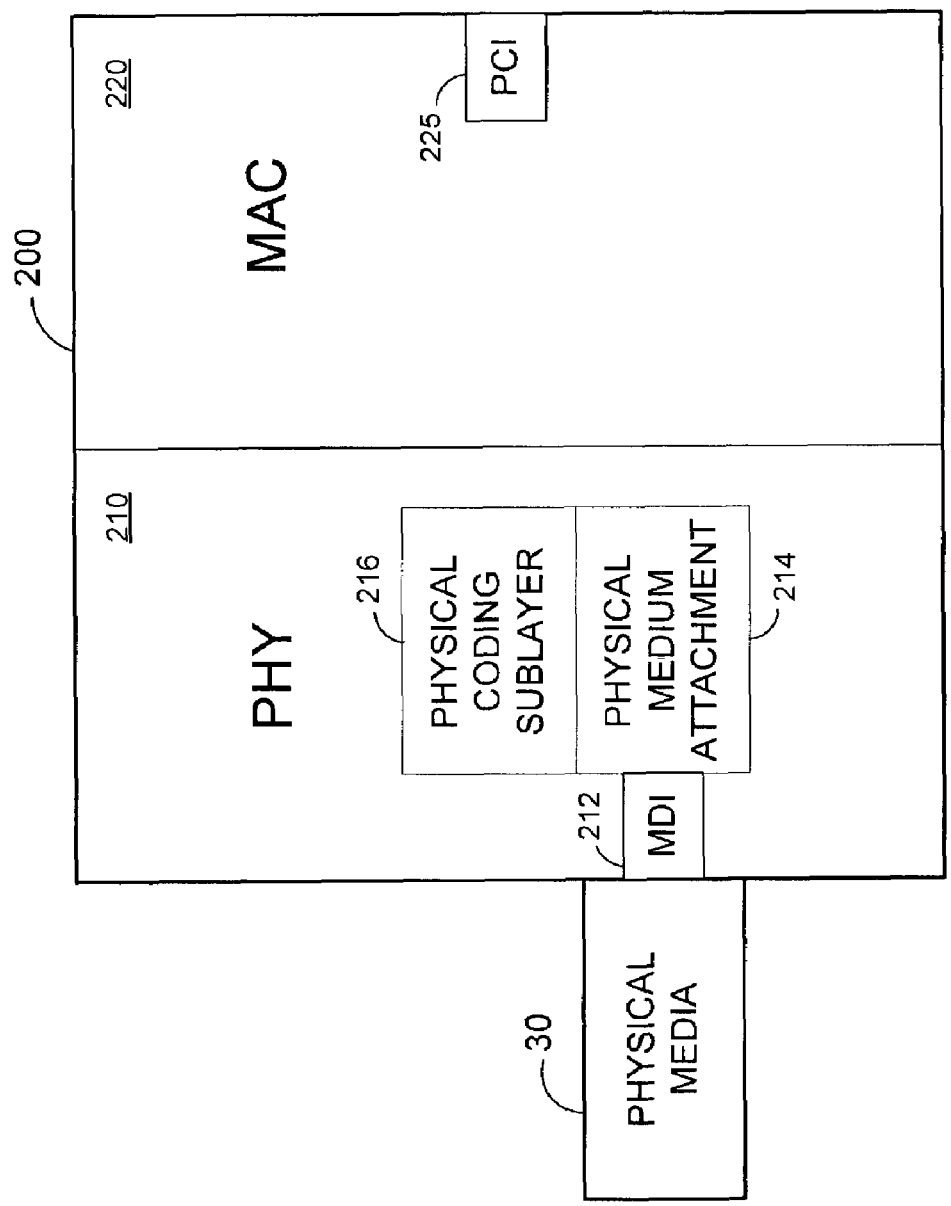
FIG. 4 is a functional block diagram of a device according to some embodiments.

FIG. 4 is a functional block diagram of device 200 according to some embodiments. Device 10 may include device 200 and device 200 may implement process 100 as described above. Device 200 may comprise an Ethernet controller or any other suitable device or devices.

Device 200 provides physical layer (PHY) 210 and Media Access Control layer (MAC) 220. The PHY functionality of device 200 includes physically interfacing with physical media 30 through Media-Dependent Interface (MDI) 212. Also included within PHY 210 are Physical Medium Attachment (PMA) 214 and Physical Coding Sublayer (PCS) 216. As shown, MDI 212 provides an interface between physical media 30 and PMA 212.

Data may be transmitted to media 30 and received from media 30 via MDI 210. PMA 212 may include functions to transmit and receive the data over all four channels and to recover a clock from all four receive channels. The data may be encoded prior to transmission and decoded after transmission by PCS 214 according to the Gigabit Ethernet standard. PCS 214 may utilize a clock recovered from a particular receive channel to decoding the data received over the particular receive channel.

MAC 220 includes Peripheral Component Interconnect (PCI) interface 225 for interfacing with a host. Interface 225 may comprise another type of interface depending on the type of interface(s) supported by the host. MAC 220 processes data received by PHY 210 prior to transmitting the data to the host via interface 225. Similarly, MAC 220 processes data received from the host prior to transmitting the data to PHY 210.

MAC 220 may provide an indication to PHY 210 in a case that MAC 220 receives data for transmission. This indication may be used at 108 of process 100 to determine if a data transmission is pending. Moreover, elements of MAC 220 may be used to determine whether the established link is "idle" at 102.

Figure 5:
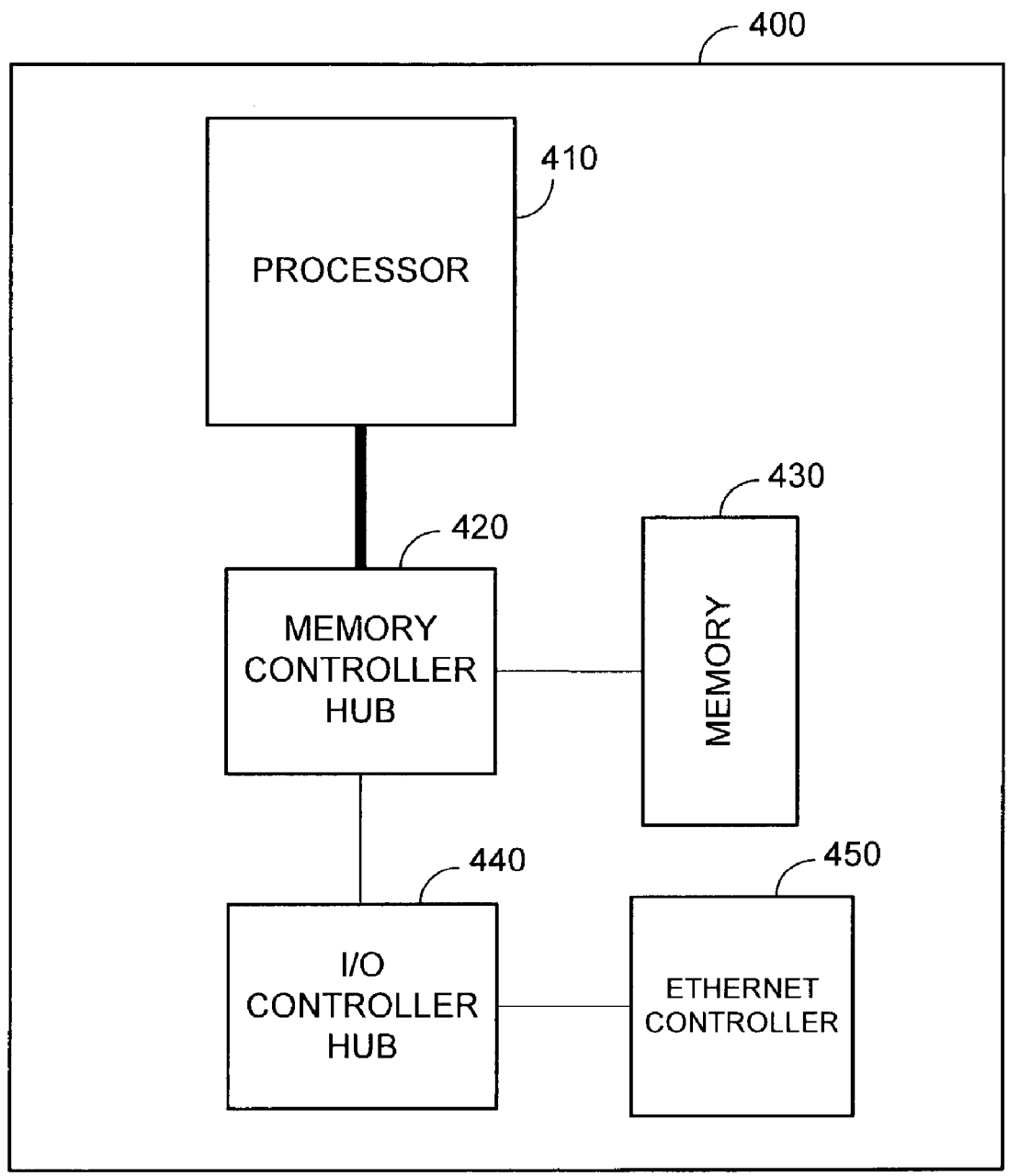
FIG. 5 is a block diagram of a system according to some embodiments.

FIG. 5 is a block diagram of system 400 according to some embodiments. System 400 may comprise a motherboard for use in a server and/or desktop computer. Processor 410 communicates with memory controller hub 420 over a system bus interface. Memory controller hub 420 may support interfaces for communication over various hardware and/or software protocols. One such interface may comprise a serial interface for exchanging data with memory 430. Memory 430 may comprise a Double Data Rate Random Access Memory (DDR RAM), a Single Data Rate Random Access Memory (SDR RAM) or any other suitable memory.

Memory controller hub 420 may also communicate with I/O controller hub 440. In this regard, I/O controller hub 440 may provide interfaces for communication over various protocols, including the Universal Serial Bus protocol and PCI protocol. I/O controller hub 440 may communicate with Ethernet controller 450 over the PCI protocol. Ethernet controller 450 may implement device 200 of FIG. 4 or may comprise any implementation of an Ethernet controller. In operation, Ethernet controller 450 may maintain a Gigabit Ethernet link with a link partner using less than four channels, and memory 430 may store data received from the link partner.

The several embodiments described herein are solely for the purpose of illustration. Embodiments may include any currently or hereafter-known elements that provide functionality similar to those described above. Therefore, persons skilled in the art will recognize from this description that other embodiments may be practiced with various modifications and alterations.

What is claimed is:

1. A method comprising:
establishing a Gigabit Ethernet link using four channels;
transmitting idle symbols between a device and a link partner;
determining that the link is idle;
transmitting a request, comprising one or more special symbols and/or one or more special packets, to the link partner to maintain the link using less than four channels;
receiving an acknowledgement to the request from the link partner;
terminating communication with the link partner over at least one of the four channels; and
maintaining the Gigabit Ethernet link with the link partner using less than four channels.

2. A method according to claim 1, further comprising:
transmitting a request to the link partner to resume communication over the four channels.

3. A method according to claim 2, further comprising:
receiving an indication of data to be transmitted to the link partner,
wherein the request is transmitted in response to the indication.

4. A method according to claim 1, further comprising:
receiving a request to resume communication over the four channels from the link partner; and
resuming communication with the link partner over the four channels.

5. A method according to claim 4, further comprising:
transmitting an acknowledgement of the request to the link partner.

6. A method according to claim 1, wherein the transmitting a request to a link partner comprises transmitting the request to the link partner if the link is idle and a request to maintain the link using less than four channels has not been received.

7. A method according to claim 1, wherein the method is performed by a device.

8. A method according to claim 7, wherein the transmitting a request to a link partner comprises transmitting the request to the link partner if the link is idle and a request to maintain the link using less than four channels has not been received.

9. A device to:
establish a Gigabit Ethernet link using four channels;
transmit idle symbols between a device and a link partner;
determine that the link is idle;
transmit a request, comprising one or more special symbols and/or one or more special packets, to the link partner to maintain the link using less than four channels;
receive an acknowledgement to the request from the link partner;
terminate communication with the link partner over at least one of the four channels; and
maintain the Gigabit Ethernet link with the link partner using less than four channels.

10. A device according to claim 9, the device further to:
transmit a request to the link partner to resume communication over the four channels.

11. A device according to claim 10, the device further to:
receive an indication of data to be transmitted to the link partner,
wherein the request is transmitted in response to the indication.

12. A device according to claim 9, the device further to:
receive a request to resume communication over the four channels from the link partner; and
resume communication with the link partner over the four channels.

13. A device according to claim 12, the device further to:
transmit an acknowledgement of the request to the link partner.

14. A device according to claim 9, wherein the device to transmit a request to a link partner comprises a device to transmit the request to the link partner if the link is idle and a request to maintain the link using less than four channels has not been received.

15. Processor-executable program code stored on a computer readable medium, the program code executable to:
establish a Gigabit Ethernet link using four channels;
transmit idle symbols between a device and a link partner;
determine that the link is idle;
transmit a request, comprising one or more special symbols and/or one or more special packets, to the link partner to maintain the link using less than four channels;
receive an acknowledgement to the request from the link partner;
terminate communication with the link partner over at least one of the four channels; and
maintain the Gigabit Ethernet link with the link partner using less than four channels.

16. Processor-executable program code stored on a computer readable medium according to claim 15, the program code further executable to: transmit a request to the link partner to resume communication over the four channels.

17. Processor-executable program code stored on a computer readable medium according to claim 16, the program code further executable to:
receive an indication of data to be transmitted to the link partner,
wherein the request is transmitted in response to the indication.

18. Processor-executable program code stored on a computer readable medium according to claim 15, the program code further executable to:
receive a request to resume communication over the four channels from the link partner; and
resume communication with the link partner over the four channels.

19. Processor-executable program code stored on a computer readable medium according to claim 18, the program code further executable to:
transmit an acknowledgement of the request to the link partner.

20. Processor-executable program code stored on a computer readable medium according to claim 15, wherein the program code executable to transmit a request to a link partner comprises program code executable to transmit the request to the link partner if the link is idle and a request to maintain the link using less than four channels has not been received.

21. A system comprising:
an Ethernet controller to establish a Gigabit Ethernet link using four channels,
to transmit idle symbols between the Ethernet controller and a link partner, to determine that the link is idle, to terminate communication with a link partner over at least one of the four channels, to maintain the Gigabit Ethernet link with the link partner using less than four channels, to transmit a request, comprising one or more special symbols and/or one or more special packets, to the link partner to resume communication over the four channels, and to receive an acknowledgement to the request from the link partner; and a Double Data Rate memory in communication with the Ethernet controller to store data received from the link partner.

* * * * *